United States Patent [19]

Hori

[11] Patent Number: 4,987,501
[45] Date of Patent: Jan. 22, 1991

[54] AMPLIFYING DEVICE

[75] Inventor: Taizou Hori, Kanagawa, Japan

[73] Assignee: Canon Kabushiki Kaisha, Tokyo, Japan

[21] Appl. No.: 267,804

[22] Filed: Nov. 7, 1988

[30] Foreign Application Priority Data

Nov. 12, 1987 [JP] Japan .................. 62-285949

[51] Int. Cl.[5] .................. G11B 15/14; G11B 5/03
[52] U.S. Cl. .......................... 360/64; 360/66
[58] Field of Search .................. 360/68, 66, 64, 61

[56] References Cited

U.S. PATENT DOCUMENTS

| | | | |
|---|---|---|---|
| 4,428,008 | 1/1984 | Fawkes | 360/61 |
| 4,438,466 | 3/1984 | Fawkes et al. | 360/68 |
| 4,580,177 | 4/1986 | Iro | 360/68 |
| 4,665,446 | 5/1987 | Takayama et al. | 360/62 |
| 4,743,985 | 5/1988 | Shibata et al. | 360/64 |

OTHER PUBLICATIONS

Application Ser. No. 6/892,584 "Recording or Reproducing Apparatus", filed 8/1/86.
Application Ser. No. 7/16,209 "Recording and Reproducing Apparatus", filed 2/19/87.

Primary Examiner—Vincent P. Canney
Attorney, Agent, or Firm—Robin, Blecker, Daley & Driscoll

[57] ABSTRACT

An amplifying device for applying a DC bias current and a signal current to a load circuit includes a current supplying element for supplying a current to the load circuit, a control signal applying circuit for applying to the current supplying element a DC bias control signal defining the DC bias current supplied from the currenting supply element, and a signal applying circuit for applying to the current supplying element an electrical signal defining the signal current, wherein the rising and falling of the DC bias control signal are provided with given time constants.

14 Claims, 5 Drawing Sheets

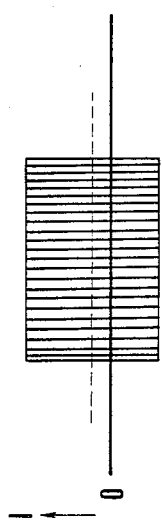
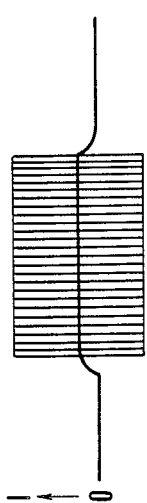
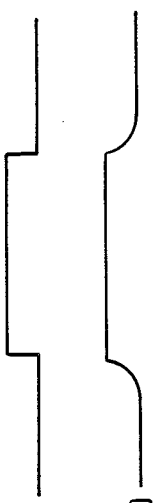
FIG.2(a) ROTARY TRANSFORMER PRIMARY SIDE CURRENT
(PRIOR ART)
FIG.2(b) HEAD SWITCHING SIGNAL
(PRIOR ART)
FIG.4(a) ROTARY TRANSFORMER PRIMARY SIDE CURRENT
FIG.4(b) HEAD SWITCHING SIGNAL
FIG.4(c) BIAS CONTROL SIGNAL

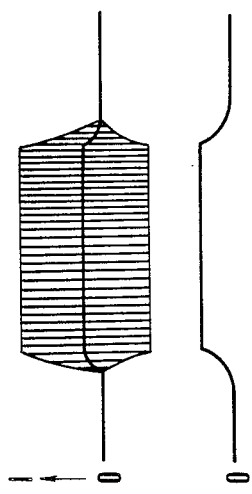
FIG.5(a) ROTARY TRANSFORMER PRIMARY SIDE CURRENT
FIG.5(b) BIAS CONTROL SIGNAL

AMPLIFYING DEVICE

BACKGROUND OF THE INVENTION

1. Field of the Invention

The present invention relates to an amplifying device, and particularly to an amplifying device suitable for use as a recording amplifier which is connected to the primary side of a rotary transformer in a video recording device.

2. Description of the Related Art

Some video tape recorders (hereinafter referred to as "VTR") have recently employed an arrangement in which the diameter of a rotary drum, the contact angle of a magnetic tape on the rotary drum, and the rotational speed are respectively two-thirds, 1.5 times and 1.5 times the corresponding dimensions of a conventional two-head helical scanning VTR, as well as having a magnetic head for signals which comprises four heads shifted 90° apart from each other. This arrangement allows miniaturization of the device to be realized while retaining compatibility with conventional magnetic tape formats.

There is not only a demand for miniaturization of such devices but also one for reductions in the level of power voltage needed. It is possible to have an optimal recording current flow through a recording head at a low voltage by causing a DC bias current to flow through the primary side (the recording amplifier side) of a rotary transformer at the stage before the recording head together with the recording current. In the case of recording with a VTR equipped with the four heads described above, even though three to four magnetic heads are always brought into contact with the magnetic tape, it is preferable to cause the recording current and the DC bias current to flow solely through a magnetic head which is actually taking part in the recording. The DC bias current is therefore also switched at the same time as the recording current.

FIG. 1 is a drawing of an example of the configuration of a conventional recording device. In FIG. 1, reference numerals 10a and 10b denote recording heads; reference numerals 12a and 12b, rotary transformers; reference numeral 14, a recording signal generating circuit for generating a recording current; reference numeral 16, a head switching signal generating circuit for generating a head switching signal; reference numeral 18, an analog switch; reference numeral 20, a current driving transistor, reference numeral 22, a resistor for providing a direct current bias for the transistor 20; and $V_B$, a supply voltage. The recording current and the DC bias current flow through the primary side of the rotary transformer 12a only when the head switching signal output from the generating circuit 16 is at a high level. FIG. 2(a) shows the waveform of the current flowing through the primary side of the rotary transformer 12a, and FIG. 2(b) shows the head switching signal generated by the generating circuit 16.

In FIG. 2(a), the recording current is shown as if its amplitude were higher than the amplitude of the DC bias current. In point of fact, however, the amplitude of the DC bias current fed to the base of transistor 20 is higher than that of the recording current. Such fact is evident from a consideration of the function of the DC bias current. FIG. 2 is thus to be appreciated as not drawn to scale and so drawn in the interests of facilitating an understanding of the invention.

If, for example, the head 10a is being used without the head 10b being used, crosstalk is produced in the rotary transformer 12b in the unused channel from the rotary transformer 12a. At this time, the primary side of the rotary transformer corresponding to the unused head is short-circuited by a mechanical switch or an electronic switch such as a transistor or the like so that it is possible to prevent the frequency components contained in the recording current from being adversely affected by the crosstalk. During switching of the DC bias current, however, an induced current having a frequency spectrum with distribution up to a low frequency is caused to flow and this affects the other channel owing to the crosstalk and thus disturbs or erases the recording magnetization pattern when the unused head is in contact with the magnetic tape.

SUMMARY OF THE INVENTION

It is an object of the present invention to resolve the aforementioned problem.

It is another object of the present invention to provide an amplifying device which is capable of preventing other load circuits from being adversely affected by the rising and falling of a DC bias current.

To this end, the present invention provides as an embodiment an amplifying device comprising a load circuit, a current supplying element for supplying a current to the load circuit, a signal applying circuit for applying an electrical signal to the current supplying element and a control signal applying circuit for applying to the current supplying element a DC bias control signal with high-frequency components removed.

It is a further object of the present invention to reduce the crosstalk produced between the heads of a magnetic recording device having a plurality of heads.

To this end, the present invention provides as an embodiment a magnetic recording device comprising a first magnetic head, a current supplying element for supplying a current to the first magnetic head, a signal applying circuit for applying an electrical signal to the current supplying element and a control signal applying circuit for applying to the current supplying element a DC bias control signal with high-frequency components removed.

Other objects and features of the present invention except for those described above will be made apparent from the detailed description of an embodiment of the present invention with reference to drawings.

BRIEF DESCRIPTION OF THE DRAWINGS

FIGS. 2(a) and 2(b) are timing charts which show waveforms of signals from the parts shown in FIG. 1;

FIGS. 4(a), 4(b) and 4(c) are timing charts which show waveforms of signals from the parts shown in FIG. 3;

FIGS. 5(a) and 5(b) are timing charts which show the waveforms of the signals from the parts in the state in which the switch 18 shown in FIG. 3 is closed.

DETAILED DESCRIPTION OF THE PREFERRED EMBODIMENT

Figure 1:
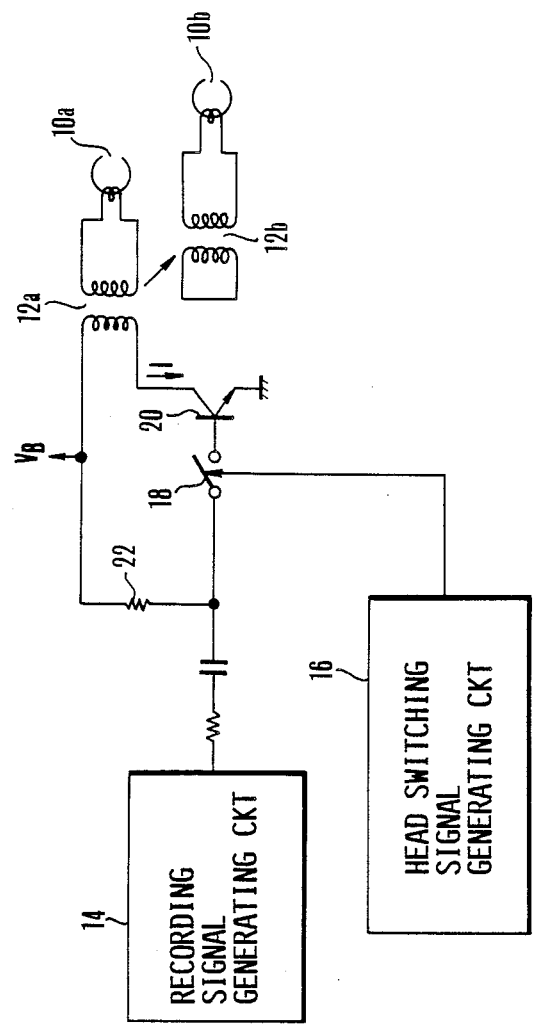
FIG. 1 is a drawing of the configuration of a principal portion of a conventional magnetic recording device.
Figure 3:
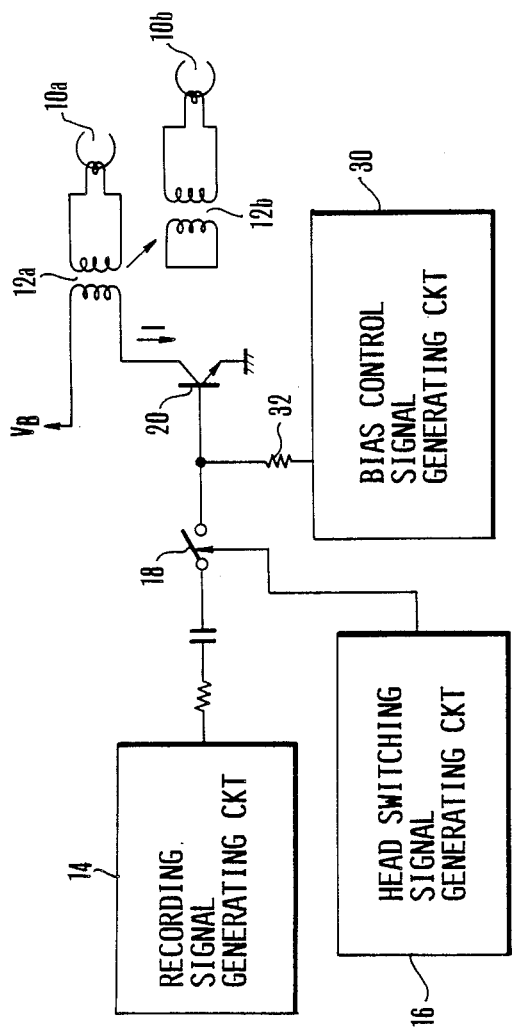
FIG. 3 is a drawing of the configuration of a principal portion of an embodiment of the present invention.

An embodiment of the present invention is described below with reference to the drawings. FIG. 3 is a block diagram of the configuration of a magnetic recording device representing an embodiment of the present invention. In this drawing, the same parts as those shown in FIG. 1 are denoted by the same reference numerals.

In FIG. 3, reference numeral 30 denotes a bias control signal generating circuit, and a resistor 32 for providing a bias is connected between the generating circuit 30 and the base of the driving current transistor 20. The recording current output from the recording signal generating circuit 14 is applied to the base of the transistor 20 through the switch 18 which is opened or closed by being controlled by the head switching signal output from the head switching signal generating circuit 16. From the viewpoint of a circuit, the transistor 20 is therefore driven either by the bias control voltage of the circuit 30 or the recording current applied by the circuit 14 (specifically by opening and closing the switch 18), and the collector current I thereof excites the head 10a through the rotary transformer 12a.

FIGS. 4(a) to 4(c) show the timing charts which show the operational waveform of the signals generated from the circuits shown in FIG. 3, in which FIG. 4(a) shows the current flowing through the primary side of the rotary transformer 12a, FIG. 4(b) shows the head switching signal output from the circuit 16 and FIG. 4(c) shows the bias control voltage output from the circuit 30. In the embodiment shown in the drawings, as can be seen from FIGS. 4(b) and 4(c), a time constant circuit is provided in the circuit 30 so as to provide the bias control voltage with time constants for the rise and fall immediately before and immediately after the head switching signal output from the circuit 16. In other words, a circuit for removing high-frequency components from the bias control voltage (signal) is provided in the circuit 30. Namely, as shown in FIG. 4(a), in the current flowing through the primary side of the rotary transformer 12a, the direct current component is first increased, the alternating current component corresponding to the recording current is then superposed on the direct current in accordance with the head switching signal, and the amplitude thereof is decreased in correspondence with the falling of the bias control voltage after the falling of the head switching signal. As a result, the high-frequency region of the frequency spectrum of the DC bias current at the time of switching can be attenuated.

As in the modified example shown in FIG. 3, the switch 18 may always be closed, and the bias control voltage output from the circuit 30 may be used in place of the head switching signal output from the circuit 16. In this case, the current flowing through the primary side of the rotary transformer 12a is a current as shown in FIG. 5(a) relative to the bias control voltage shown in FIG. 5(b). Namely, the transistor 20 is turned off or on by using the bias control voltage output from the circuit 30.

Figure 6A:
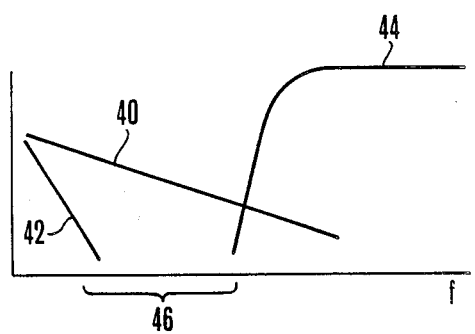
FIGS. 6(a), 6(b) and 6(c) are drawings for comparison of the characteristics between the device shown in FIG. 1 and the device shown in FIG. 3.
Figure 6B:
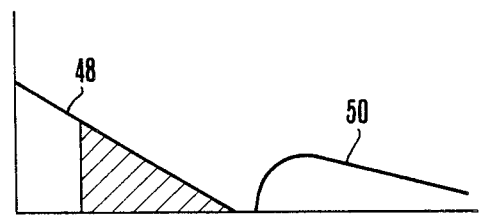
Figure 6C:

FIGS. 6(a) to 6(c) are drawings showing a comparison between the characteristics of the devices shown in FIGS. 1 and 3. FIG. 6(a) is a drawing showing a comparison of the frequency the spectrum of each of the currents flowing through the recording heads, in which reference numeral 40 denotes the frequency spectrum of the direct current bias flowing through the primary side of the rotary transformer shown in FIG. 1, reference numeral 42 denotes the frequency spectrum of the direct current bias flowing through the primary side in a case wherein the time constants are provided in the switching of the direct current bias by the device shown in FIG. 3, and reference numeral 44 denotes a recording signal such as a luminance signal, color-difference signal or pilot signal. Since the portion denoted by reference numeral 46 represents a frequency region where the other channels are affected by the crosstalk, the time constants for switching are so set as to be outside this region.

FIG. 6(b) shows the spectra of the currents flowing through the unused head owing to the crosstalk of the rotary transformer in the device shown in FIG. 1, in which reference numeral 48 denotes the spectrum of the current generated by switching the DC bias (corresponding to the characteristic shown by the reference numeral 40 in FIG. 6(a)) and reference numeral 50 denotes the spectrum of the recording current 44. In the hatched portion, the magnetization pattern of the magnetic tape is disturbed or erased. When the switching of the DC bias is provided with the time constants as in the device shown in FIG. 3, the characteristics shown in FIG. 6(b) are changed into the characteristics shown in FIG. 6(c), with no spectrum being generated in the frequency region corresponding to the hatched portion shown in FIG. 6(b). In FIG. 6(c), reference numeral 52 denotes a characteristic corresponding to that denoted by the reference numeral 42 in FIG. 6(a), and reference numeral 54 denotes a characteristic corresponding to that denoted by the reference numeral 44 in FIG. 6(a).

Although the above-described embodiment uses the ordinary transistor 20 as an element for supplying the current flowing through the recording head, it is a matter of course that other elements for supplying currents may be used.

The present invention can also be applied to a configuration for switching currents to be applied to magnetic heads in the case of using a rotary drum having a normal diameter and two recording magnetic heads, or the case of using three magnetic heads further comprising a rotary erasing head.

As can be easily seen from the above description, the present invention is capable of effectively removing any adverse influence on other circuits by adopting a circuit having a simple configuration and is thus extremely practical.

What is claimed is:

1. An amplifying device, comprising:
   (a) a load circuit;
   (b) a first generating circuit for generating an electric signal relating to an information signal;
   (c) a second generating circuit for generating a DC bias signal including a DC component in which rising and falling high frequency components have been removed; and
   (d) a current supplying element for receiving said electric signal and said DC bias signal and supplying to said load circuit a driving current having a DC component corresponding to said DC bias signal and a current value varying in accordance with said electric signal.

2. A device according to claim 1, further comprising:
   a switching circuit positioned between said first generating circuit and said current supplying element and selectively operable for conducting or not conducting said electric signal to said current supplying element.

3. A device according to claim 2, wherein said switching circuit includes a switch interposed between said first generating circuit and said current supplying element, and a switching signal generating circuit for generating a switching signal for controlling said switch.

4. A device according to claim 3, wherein said second generating circuit and said switching signal generating circuit are operative to cause said DC bias control signal to synchronize with said switching signal.

5. A device according to claim 1, wherein said electric signal is constantly applied to said current supplying element and wherein said current supplying element is operatively responsive to said DC bias signal to decide whether or not said driving current is to be supplied to said load circuit.

6. A device according to claim 1, wherein said DC bias signal periodically includes DC components.

7. A device according to claim 6, wherein said load circuit includes a rotary transformer and a magnetic head.

8. A device according to claim 1, wherein said driving current has a current value corresponding to a superposed signal of said electric signal and said DC bias signal.

9. A magnetic recording device, comprising:
(a) a magnetic head;
(b) a first generating circuit for generating an electric signal relating to an information signal;
(c) a second generating circuit for generating a DC bias signal including a DC component in which rising and falling high frequency components have been removed; and
(d) a current supplying element for receiving said electric signal and said DC bias signal and for supplying to said magnetic head a recording current having a DC component corresponding to said DC bias signal and a current value varying according to said electric signal.

10. A device according to claim 9, further comprising:
a further magnetic head arranged adjacent to the first-mentioned magnetic head.

11. A device according to claim 10, wherein said first-mentioned magnetic head and said further magnetic head are rotary heads and have respective rotary transformers connected thereto.

12. A device according to claim 9, wherein said magnetic head is a rotary head and wherein said DC bias signal periodically includes DC components in synchronized relation to the rotation of said magnetic head.

13. A device according to claim 12, further comprising:
a switching circuit positioned between said first generating circuit and said current supplying element and selectively operable for conducting or not conducting said electric signal to said current supplying element.

14. A device according to claim 12, wherein said electric signal is constantly applied to said current supplying element and wherein said current supplying element is operably responsive to said DC bias signal to decide whether or not said recording current is to be supplied to said load circuit.

* * * * *